(12) United States Patent
Klockseth

(10) Patent No.: US 9,827,723 B2
(45) Date of Patent: Nov. 28, 2017

(54) FULL FACE MASK FOR A PAPR

(75) Inventor: Oliver Klockseth, Järfälla (SE)

(73) Assignee: Facecover Sweden AB, Järfälla (SE)

( * ) Notice: Subject to any disclaimer, the term of this patent is extended or adjusted under 35 U.S.C. 154(b) by 824 days.

(21) Appl. No.: 13/703,433

(22) PCT Filed: Jun. 14, 2011

(86) PCT No.: PCT/SE2011/050729
§ 371 (c)(1),
(2), (4) Date: Dec. 11, 2012

(87) PCT Pub. No.: WO2011/159233
PCT Pub. Date: Dec. 22, 2011

(65) Prior Publication Data
US 2013/0087151 A1 Apr. 11, 2013

(30) Foreign Application Priority Data
Jun. 18, 2010 (SE) ........................ 1050629

(51) Int. Cl.
B29D 11/00 (2006.01)
A62B 18/10 (2006.01)
(Continued)

(52) U.S. Cl.
CPC ............ *B29D 11/0074* (2013.01); *A62B 7/10* (2013.01); *A62B 18/02* (2013.01); *A62B 18/08* (2013.01);
(Continued)

(58) Field of Classification Search
CPC ....... B29D 11/0074; A62B 7/10; A62B 18/10; A62B 18/08; A62B 18/02; A62B 17/006; A62B 17/04; A62B 17/08; A62B 18/00; A62B 18/003; A62B 18/006; A62B 18/025; A62B 18/04; A62B 18/045; A62B 18/06; A62B 18/084; B29C 51/422; A41D 13/11; A41D 13/1107; A41D 13/1153; A41D 13/1161; A41D 13/1176; A41D 13/1184; A42B 3/28; A42B 3/286; A42B 3/288
(Continued)

(56) References Cited

U.S. PATENT DOCUMENTS 3,822,698 A * 7/1974 Guy ..................... A62B 18/045
128/201.25
4,549,542 A * 10/1985 Chien .................. A62B 18/045
128/201.24
(Continued)

FOREIGN PATENT DOCUMENTS

CN 1901974 A 1/2007
CN 101622035 A 1/2010
(Continued)

Primary Examiner — (Jackie) Tan-Uyen T Ho
Assistant Examiner — Joseph D Boecker
(74) Attorney, Agent, or Firm — Blank Rome LLP

(57) ABSTRACT

A full face mask (1) for a PAPR (Powered Air Purifying Respirator) to be used in health hazardous environments, having an air inlet (7, 8) and an air outlet (16), manufactured in one piece from a transparent plastic in a one step vacuum forming process with a single curved field of vision (4) exempt from distortions and comprising a compartment (5) inside a forehead area of the full face mask for accommodating a blower unit (2).

14 Claims, 6 Drawing Sheets

Figure 1:
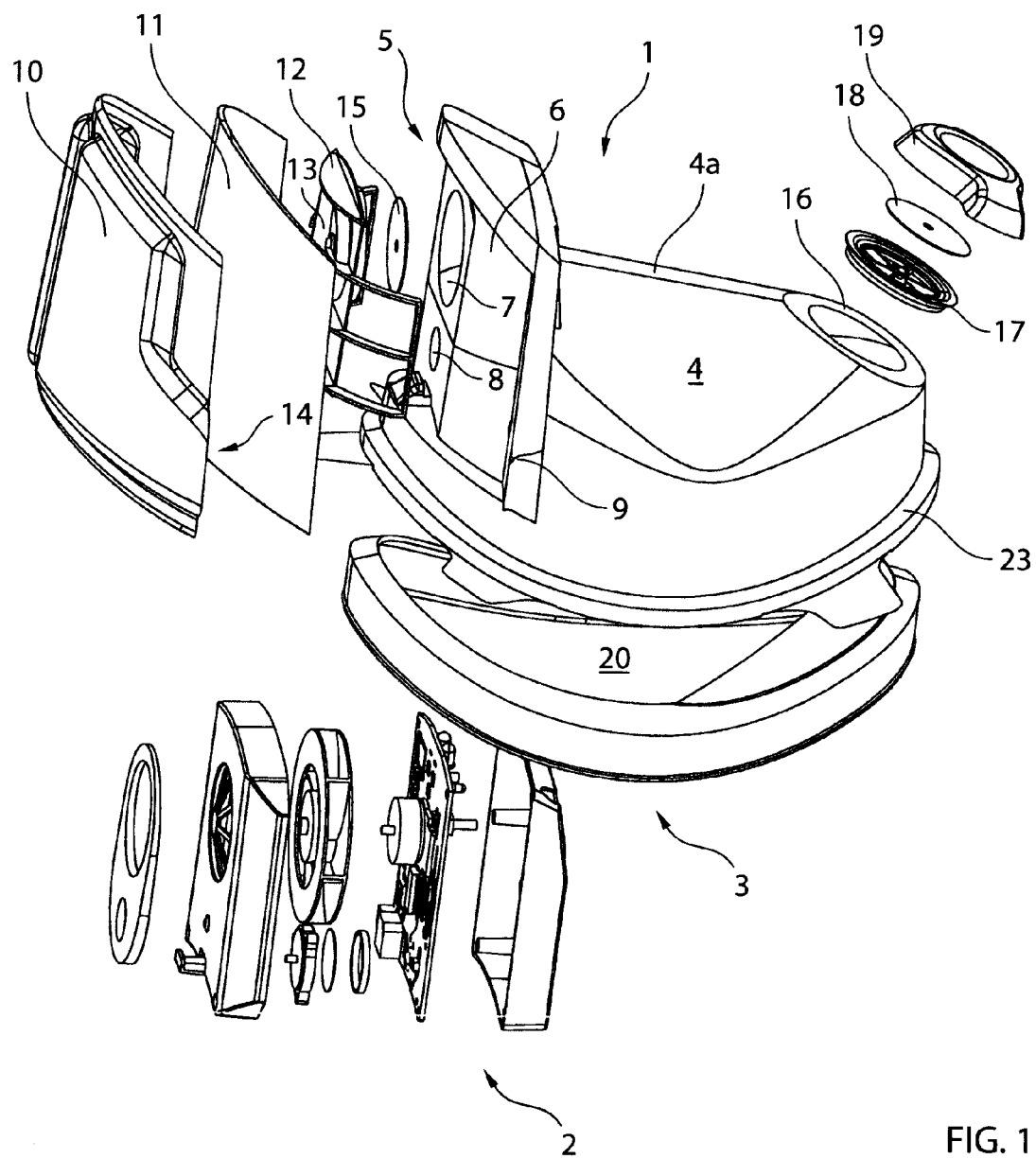

(51) Int. Cl.
*A62B 7/10* (2006.01)
*A62B 18/02* (2006.01)
*A62B 18/08* (2006.01)
*B29C 51/42* (2006.01)
*A42B 3/28* (2006.01)

(52) U.S. Cl.
CPC ............ *A62B 18/10* (2013.01); *B29C 51/422* (2013.01); *A42B 3/286* (2013.01)

(58) Field of Classification Search
USPC ............ 128/205.12, 206.15, 204.21, 205.23, 128/206.12, 206.21, 207.12, 201.23, 128/201.22, 201.24, 204.18
See application file for complete search history.

(56) References Cited

U.S. PATENT DOCUMENTS

| | | | |
|---|---|---|---|
| 4,730,612 A * | 3/1988 | Dampney | A62B 18/045 128/201.24 |
| 4,950,445 A * | 8/1990 | Salce et al. | 264/549 |
| 5,023,023 A | 6/1991 | Elenewski | |
| 5,104,430 A * | 4/1992 | Her-Mou | A62B 18/006 128/205.29 |
| 6,014,971 A * | 1/2000 | Danisch | A62B 18/045 128/201.22 |
| 6,752,146 B1 * | 6/2004 | Altshuler | A62B 17/04 128/201.25 |
| 6,996,846 B1 | 2/2006 | Karapetyan | |
| 7,007,690 B1 * | 3/2006 | Grove et al. | 128/201.25 |
| 7,195,015 B2 * | 3/2007 | Kuriyama | 128/205.12 |
| 7,878,195 B2 * | 2/2011 | Alvey et al. | 128/201.23 |
| 2007/0163588 A1 * | 7/2007 | Hebrank | A61L 9/16 128/204.18 |
| 2007/0221214 A1 * | 9/2007 | Brockman | A62B 18/006 128/201.25 |
| 2007/0235032 A1 | 10/2007 | Betz et al. | |
| 2009/0025727 A1 * | 1/2009 | Klun et al. | 128/206.21 |
| 2010/0065058 A1 * | 3/2010 | Ungar et al. | 128/206.24 |
| 2012/0131730 A1 * | 5/2012 | Shoham et al. | 2/411 |

FOREIGN PATENT DOCUMENTS

| | | |
|---|---|---|
| DE | 1 000 239 B1 | 1/1957 |
| EP | 0 304 641 A1 | 3/1989 |
| EP | 2 165 739 A1 | 3/2010 |
| GB | 2 215 267 A | 9/1989 |
| WO | WO 98/13103 A1 | 4/1998 |
| WO | WO 2009/023599 A1 | 2/2009 |

* cited by examiner

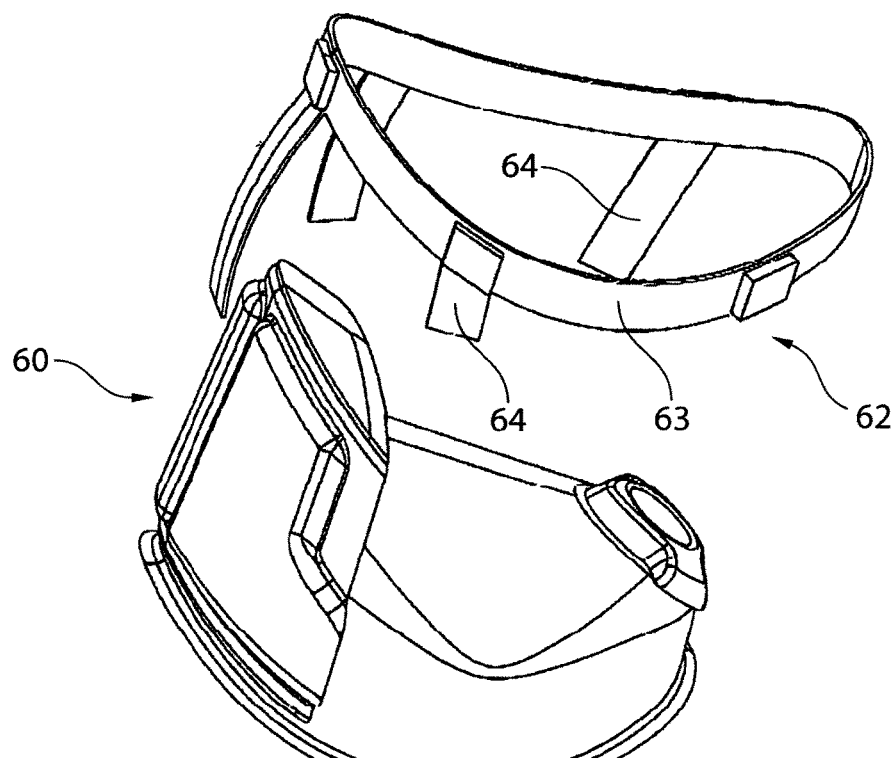
FIG. 6
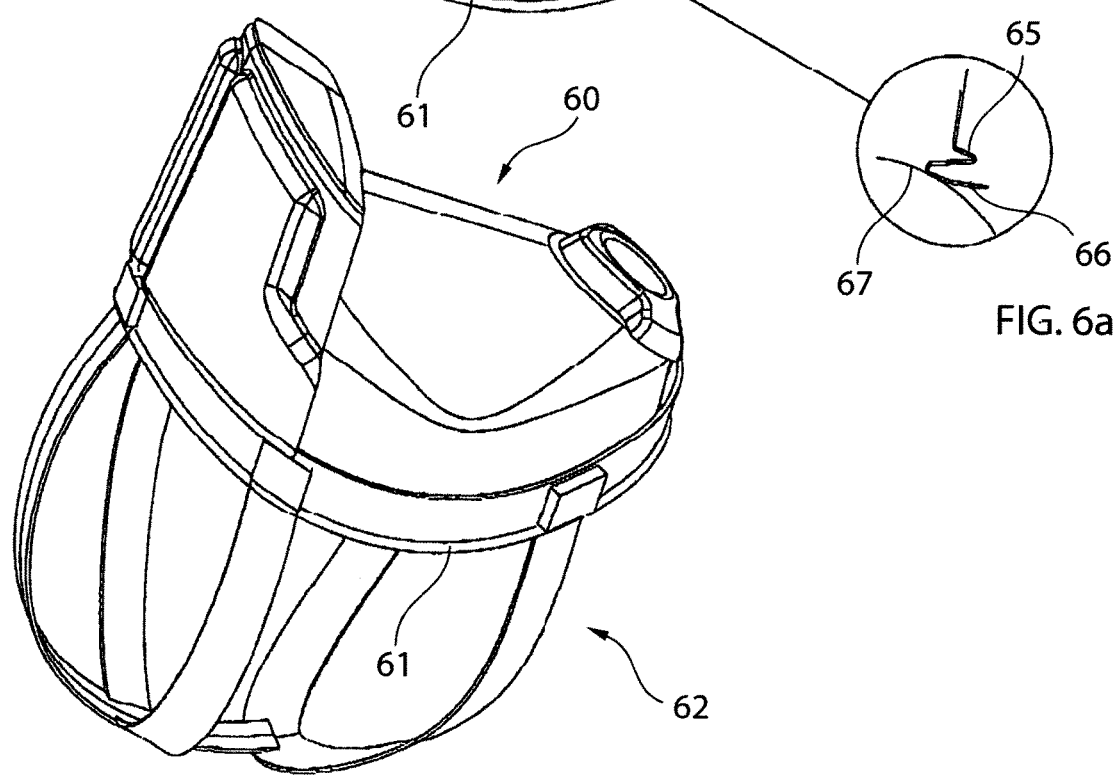
FIG. 6a
FIG. 7

FULL FACE MASK FOR A PAPR

TECHNICAL FIELD

The present invention relates to PAPRs (Powered Air Purifying Respirator), and more specifically a full face mask for PAPRs to be used in health hazardous environments, such as scenes of fire, construction sites, virus containing environments and the like.

BACKGROUND

For personal protection, hand washing is of course essential, but for health care personal and others subjected to virus containing environments, there are masks and respirators. Facemasks or surgical masks are mostly loose fitting disposable masks stopping droplets and skin or hair particles, and prevent splashes from contacting the face of the wearer, but they are no good for virus protection e.g. because of sealing problems against the face, and a negative pressure inside the mask during inhalation. Respirators, and in this context air-purifying respirators are air filtering devices that protect against inhalation of both large and small particles by removing contaminants by filtration or absorption. They may be passive, APR, or powered, PAPR.

The PAPRs of today have a great advantage over APRs, because they only require a simple fit test, and they do not increase the work of breathing. However, because of growth of beard, wrinkles etc. it is difficult to obtain a perfect sealing against the face. These problems are set aside by providing a positive pressure inside the face mask. However, there are also a number of disadvantages with today's PAPRs, they require special training to put on, to use safely and to take off; fan noise impedes conversation; it is difficult to use a stethoscope. They may cause claustrophobia.

Made of thick rubber or other sound restricting material, they make conversation difficult and therefore require special amplifiers or speech diaphragms, and telephone conversation is virtually impossible.

Another great disadvantage is that it is very difficult to see were you put your feet because of the restricted field of vision when looking down, especially when remounting a staircase.

Still another disadvantage is that the weight of existing PAPRs is considerable, causing a lot of strain on the neck, and they are therefore quit uncomfortable for a normal human being, such as nurses, doctors, etc.

Therefore, there is a great need of improvements of existing PAPRs. Also in other areas there is always a need for comfortable easy-to-use safety equipment with improved performance.

THE INVENTION

One object of the invention is to provide a full face mask for a PAPR which is easy to use and comfortable to wear, and does not interfere with the use of other equipment.

Another object of the invention is to provide a method for the manufacture of a full face mask for a PAPR with a perfectly clear field of vision.

A further object of the invention is to provide a disposable full face mask for a PAPR.

A further object of the invention is to provide a blower unit giving rise to a minimum of fan noise and with the ability to control the pressure inside a full face mask, and preferably to maintain a positive pressure inside the mask.

A further object of the invention is to provide a full face mask for a PAPR capable of housing a blower unit inside the full face mask to be protected from the environment and eliminating ducting and flow losses, and being reusable with its own rechargeable battery but with the option to use an external battery connected through a wire.

A further object of the invention is to provide a full face mask with integrated filter, preferably an electrostatic filter for minimizing the flow resistance.

These and other objects of the invention are attained with the PAPR according to the present invention as it is defined in claim 1.

Preferred embodiments and developments of the invention are made the object of sub claims.

SHORT DESCRIPTION OF THE DRAWINGS

Figure 2:
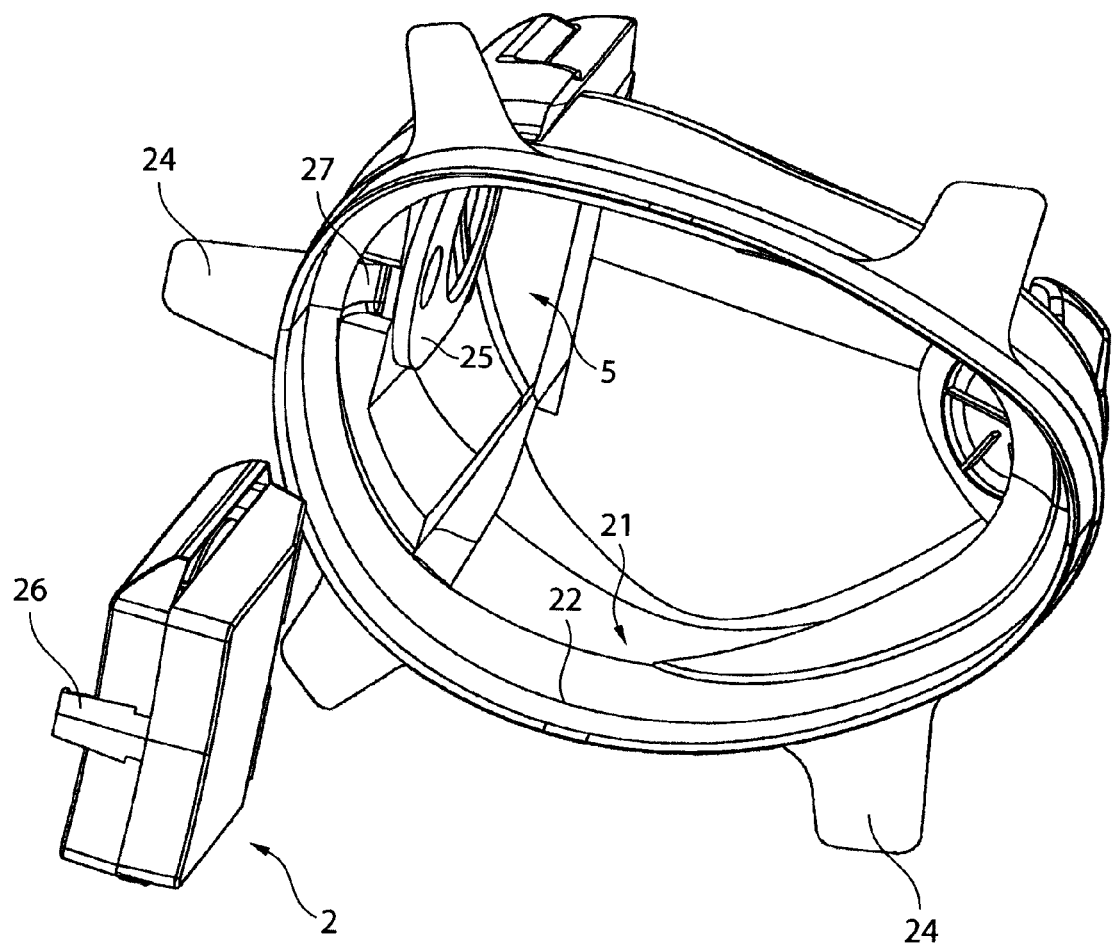
Figure 3:
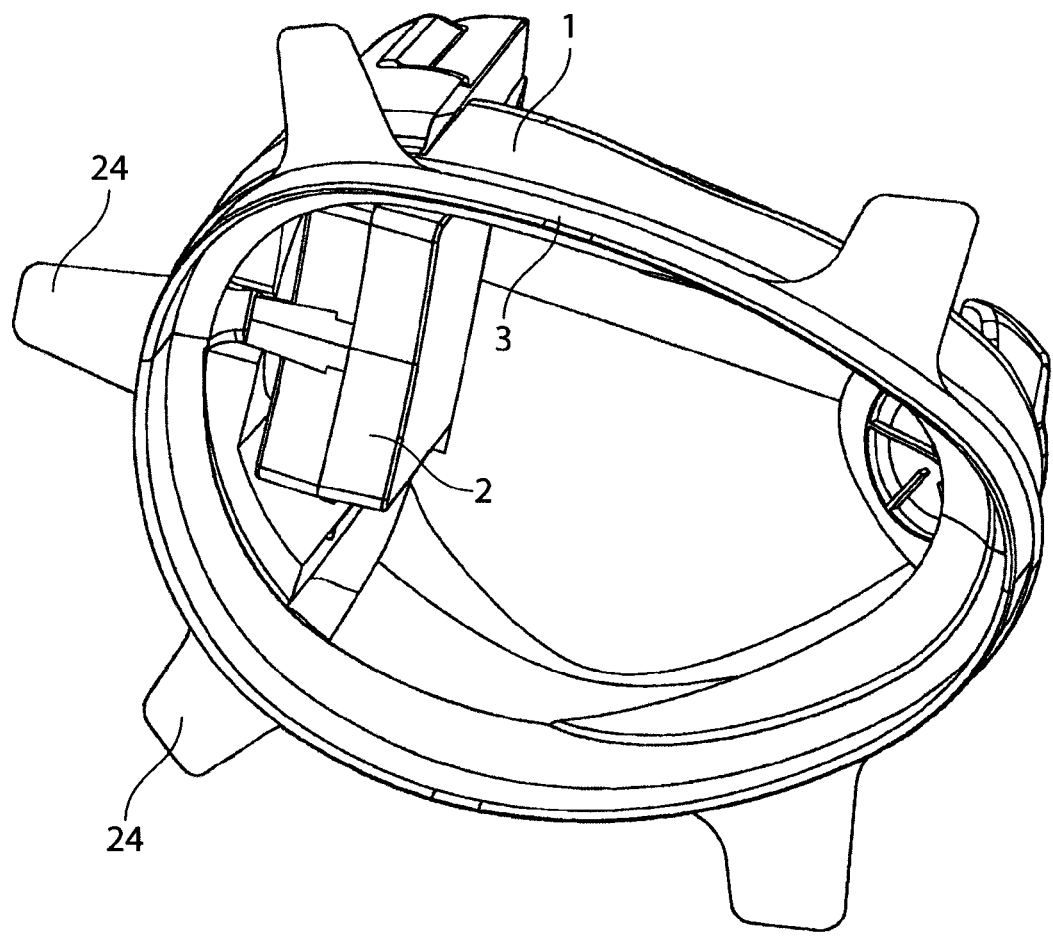
Figure 4:
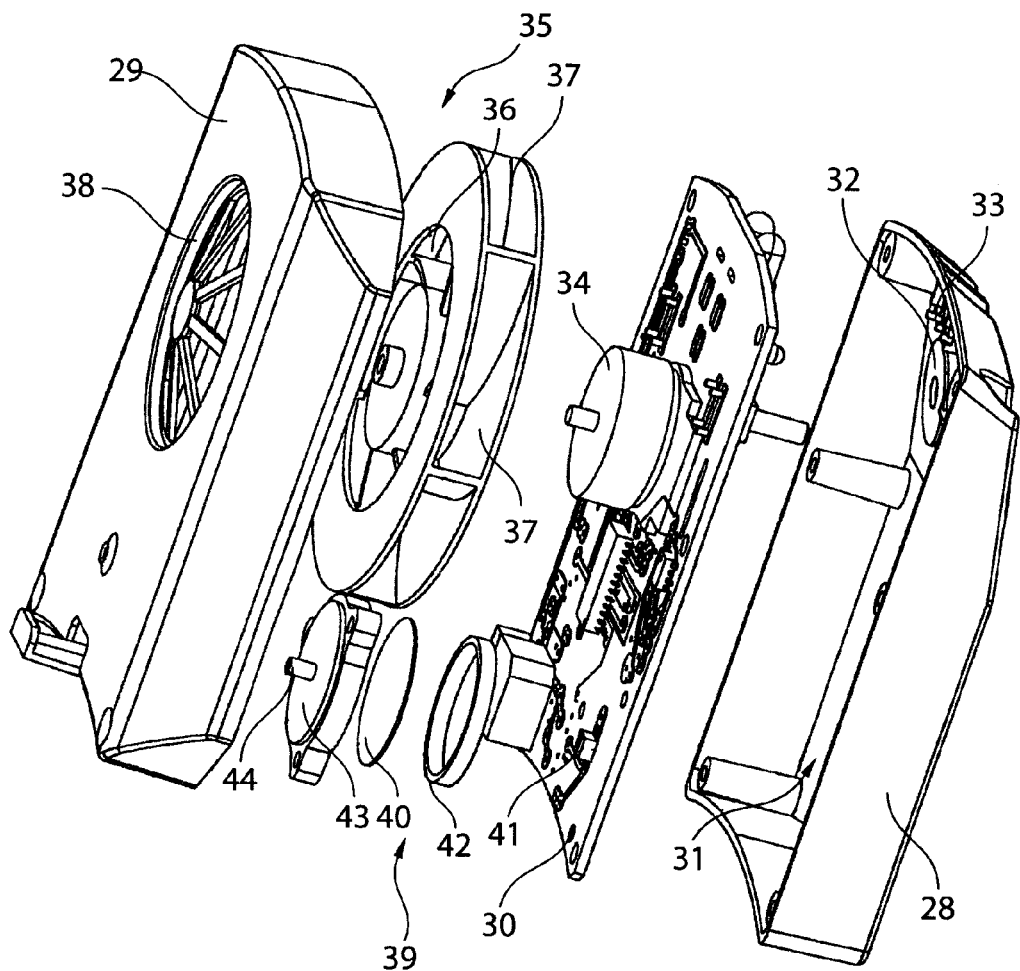
Figure 5:
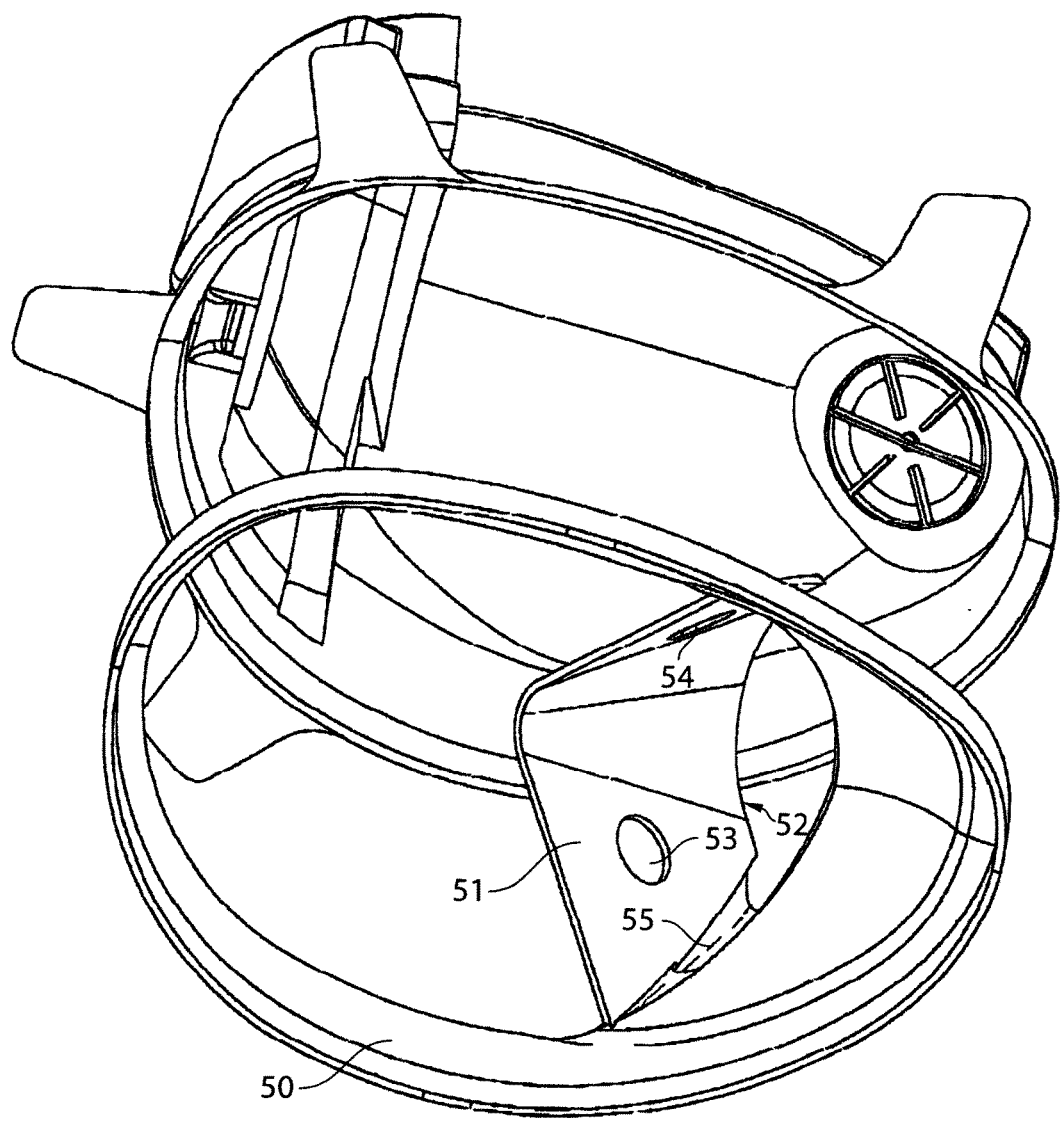

The invention will be explained more in detail in the following description of embodiments of the invention shown in the drawings, on which FIG. 1 shows schematically an exploded view of the PAPR according to the invention, FIG. 2 shows schematically a view from behind of the face mask with the blower unit separated from the face mask, FIG. 3 shows a view corresponding to FIG. 2 with the blower unit installed in the face mask, FIG. 4 shows a schematic exploded view of the blower unit in enlarged scale, FIG. 5 shows an alternative embodiment of a gasket for the full face mask comprising an inner mask, FIG. 6 shows a further embodiment of the face mask according to the invention with integrated sealing rim and with a separate harness, FIG. 6a shows a cross sectional view of the integrated rim in an enlarged scale, and FIG. 7 shows a view corresponding to FIG. 6 with the full face mask inserted in the harness

DETAILED DESCRIPTION OF PREFERRED EMBODIMENTS

In FIG. 1 a schematic exploded view of a PAPR incorporating one embodiment of the full face mask according to the invention. The full face mask 1 is shown to the right and a blower unit 2 to the left. According to this embodiment a face seal 3 is provided for sealing off the interior of the full face mask against the face.

The full face mask 1 is manufactured in one piece preferably from PET (polyethylene terephtalate) by vacuum forming. Although PET is a preferred plastic material because of its properties, other plastic materials can be used as well. The field of vision 4 is a single curved surface, the foremost part of which is indicated with a line 4a.

According to the invention, the field of vision is clear and devoid of any distorted areas, which is accomplished by manufacturing the full face mask from a transparent plastic in one piece in a vacuum forming process, in which method a plastic film or sheet is heated, while heat is prevented from reaching an area corresponding to a field of vision of the full face mask. During the vacuum forming process the field of vision is given a single curved form by suction towards a forming surface, and when the heated parts of the plastic after being vacuum formed have cooled, they will maintain the desired form of the field of vision, which will be perfectly clear with a perfect visibility without any distortions.

In the forehead area there is a compartment 5 for accommodating the blower unit 2, which compartment is open towards the interior of the face mask as is clearly shown in FIG. 2. This compartment 5 forms a protrusion, with an upper wall 6 extending substantially perpendicular to the face mask. In the upper wall of the compartment two openings 7, 8, FIG. 1, are arranged, the function of which will be explained below. Further, the upper wall is designed with a rim 9. A filter unit is formed with an outer wall element 10 to be bonded to said rim. In the resulting chamber a filter element 11 is be encased. Between the filter and the upper wall of the blower unit compartment is arranged a support 12 for the filter acting as a spacer. A valve seat 13 can be integrated with the support, as is illustrated in FIG. 1.

At present, the placement of the blower unit in a chamber in the forehead area of the full face mask is preferred, but as is obvious, a compartment for the blower unit could be place in another part of the full face mask.

The outer wall element 10 has air inlet openings 14, which should be designed to prevent entrance of contaminants into the filter compartment. For example, it might be necessary to shower when wearing the face mask, or if used outside it might be raining.

The filter element 11 is preferably an electrostatic filter, which has a low flow resistance. A suitable electrostatic filter material is MES from Munktell Filter AB, Sweden. However, the filter element can also be a HEPA filter, a carbon filter or any combination of electrostatic filter, HEPA filter and carbon filter.

According to one embodiment of the invention a one-way valve is arranged in the opening 7 between blower unit compartment and filter unit with a flexible diaphragm 15, made of e.g. rubber or a material having properties corresponding to rubber. This is a reliable and inexpensive solution. If a more linear action is desired a valve working with a spring loaded sealing member can be used.

In the area of the face mask in the vicinity of the mouth the air outlet 16 is arranged. In the illustrated embodiment an exhalation valve is arranged in the air outlet in the form of a one-way valve having a valve seat 17 and a flexible or spring-loaded diaphragm 18 opening during exhalation, and closing during inhalation. A housing 19 is arranged on the outside of the valve, with air outlet openings. The volume of the housing should be sufficient to create a volume of exhalation air outside the valve which will prevent surrounding air from entering the valve during the time it takes for it to close when a person using the PAPR stops exhaling and begins inhaling.

The sealing 3 sealing the full face mask 1 against the face of a wearer is preferably also vacuum formed in one piece. It is then cut or stamped to have a central opening 20 adapted to the full face mask. The sealing is designed with a form adapted to the form of the face mask having a rim 21 lying adjacent to the inner sides of the full face mask, and also having a fold 22 in order to abut the rim 23 of the full face mask thereby creating double sealing surfaces against the face of the wearer. The sealing is preferably made of polyethylene.

Flaps 24 are arranged around the perimeter of the face mask for strapping the face mask over the face with the straps meeting at the back of a wearer's head. As is conventional, a wearer will be able to adjust the straps so that the face mask feels comfortable to wear while at the same time a sufficient pressure is exerted on the sealing to obtain the sealing effect between the interior of the full face mask and the surroundings. Other arrangements are of course also possible.

In FIG. 2 a gasket 25 is arranged around the openings in the upper wall of the compartment 5 for sealing against the blower unit 2 and the blower unit is shown in its assembled state. A snap hook element 26 is arranged at one end of the blower unit facing a wearer, which detachably locks the blower unit in the face mask in a corresponding seat 27 in the face mask. The extension of the snap hook element is adapted so that, when the blower unit is locked in the full face mask, a sufficient pressure is exerted on the gasket 25 to obtain a desired sealing effect around the openings in the upper wall of the blower unit compartment.

FIG. 3 illustrates the blower unit 2 installed in its compartment 5 in the full face mask and with the face mask sealing 3 preferably permanently bonded to the face mask.

In FIG. 4 an exploded view of the blower unit according to the invention is shown. It comprises a housing with a lower part 28 and an upper part 29. Electronic components are arranged on a printed circuit card 30, which, when the blower unit is assembled, will lie in the middle of the housing formed by the lower and upper part of the housing, creating two compartments.

In the lower compartment 31 underneath the printed circuit card there is space for a rechargeable battery, and also for further operative functions. As is schematically shown in the front end of the lower housing part a diaphragm push button 32 is arranged in the wall as well as contact elements 33 to be connected to the printed circuit card. Such push buttons can be operated by pressing them through the lower blower unit compartment wall of the face mask. In a preferred embodiment of the invention, one push button operate the start/stop function of the blower motor, another push button operates a LED light arranged at the front end of the blower unit. Further, although not shown in FIG. 4. LED indicator lamps are preferably arranged in the lower wall of the housing for indicating e.g. that the blower is running, the remaining capacity of the rechargeable battery, that a predetermined pressure prevails in the face mask, etc. Further, a connector for connection of an external battery through a wire can be arranged in a compartment wall, making it possible to change batteries without taking of the face mask.

In the upper part of the housing, the functional parts of the blower unit are arranged. The electronic circuits being known per se will not be described in detail. A battery powered motor 34 drives a fan wheel 35. In the embodiment shown on the drawings the fan wheel has an axial inlet 36 and radial outlets 37, but other designs are also possible. Filtered air is drawn by the fan wheel through an opening 38 in the upper part of the blower unit housing and through the opening in the upper wall of the blower unit compartment from the filter unit.

In order to maintain a predetermined overpressure inside the full face mask the blower unit comprises a differential pressure gauge. In the embodiment illustrated in the FIGS. 1 and 4, a differential pressure sensor 39 with a flexible diaphragm 40 is used together with a combination 41 of an IR light emitter and a reflected IR light receiver for IR light reflected from the surface of diaphragm. The sensor comprises said flexible diaphragm 40 arranged at a distance above the printed circuit card 30 defined by a spacer 42 and a cover 43 being fastened to the printed circuit card and having a channel 44 communicating with the ambient through the filter unit via a separate opening 8, FIG. 1, in the upper wall of the blower unit compartment 5. The diaphragm 40 has a diameter exceeding the diameter defined by the spacer or a seat for the diaphragm in the spacer or in the cover, and with a free space underneath and above the diaphragm.

When the pressure outside the filter unit exceeds the pressure in the full face mask the diaphragm will "flap" downwards, and when the pressure in the full face mask exceeds the pressure outside the filter unit the diaphragm will "flap" upwards. The sensor sensing the reflected IR light will react and signals will be sent to a microprocessor on the printed circuit card, which with appropriate circuitry will regulate the blower motor accordingly to maintain a desired overpressure in the full face mask.

The motor 34 is a small motor with sensors controlled by a microprocessor. The microprocessor also receives signals regarding for example pressure and battery charge level. Based on data signals received, the microprocessor sends out audible and/or visual warning signals and instructions for the operation of the motor.

In FIG. 5, a further embodiment of the full face mask sealing is illustrated. The sealing 50 has an integral part 51 forming an inner mask sealing off an upper volume in the full face mask from a lower volume. A front edge 52 of the part 51 sealingly abuts the inner surface of the full face mask above the air outlet of the full face mask. As illustrated in FIG. 5 the upper and lower volumes communicate through openings 53, 54. One-way valves may be arranged in said openings. In an alternative embodiment a front edge 52 is made flexible in order to seal against the inner surface of the full face mask during exhalation, and open during inhalation.

The purpose of the inner mask is to reduce the exhalation air volume and prevent build up of $CO_2$ inside the full face mask in case the blower unit stops working. At the same time this allows the use of the full face mask in APR mode, i.e. as an Air Purifying Respirator.

In order to make the full face mask for a PAPR according to the invention more flexible, it is possible to provide the an inner mask, and in case the inner mask is not wanted, it can be removed. In order to simplify this option, weakening lines can be arranged as is illustrated in FIG. 5 with a dotted line 55 in the areas, where the inner mask is connected to the full face mask sealing 50.

A second embodiment of the full face mask according to the invention is schematically illustrated. Only the differences between this embodiment and the embodiment according to FIGS. 1-5 will be discussed.

The full face mask 60 differs from the full face mask according to the previous embodiment in that it is designed with an integrated sealing rim 61. This rim 61 also forms a seating for a harness 62 comprising a closed band element 63 adapted to fit snugly around the perimeter of the full face mask and to abut the rim 61 thereof. Straps 64 fastened in the band element 63 have the function to tighten the full face mask against the face of a wearer.

A suitable embodiment to the sealing rim 61 of the full face mask is illustrated in FIG. 6a. The rim is formed with folds 65 and a free end part 66 approximately perpendicular to the extension of the adjacent part of the full face mask. With this embodiment the sealing rim will act as a bellows which adjusts to the face of a wearer, indicated at 67.

The rim can of course be designed in different forms giving the same effect, but as shown, it should be resilient, and of course, it should be possible to produce the full face mask in a one step vacuum forming process inclusive of the rim.

In FIG. 7 the full face mask 60 is shown inserted in the harness 62.

One great advantage with the embodiment according to FIGS. 6 and 7 is that the full face mask is produced in one piece, and no extra sealing means is needed. The harness can be reused when the face mask needs to be discarded.

The invention claimed is:

1. A disposable full face mask for a PAPR (Powered Air Purifying Respirator) to be used in health hazardous environments, having an air inlet and an air outlet, said full face mask being manufactured in one piece from a transparent plastic in a one-step vacuum forming process with a transparent visor having a single curved field of vision exempt from distortions, wherein said full face mask comprises a filter unit as an integral part of the full face mask, a compartment inside the full face mask for accommodating a blower unit inside the full face mask for maintaining a positive pressure inside the mask, said compartment and the blower unit accommodated therein being situated between the transparent visor and the forehead area of a user of the full face mask and being open towards an interior of the full face mask, wherein said blower unit is protected from the environment by said filter unit, and wherein said blower unit is detachably connected to the compartment so as to enable reuse of the blower unit when the full face mask is disposed of, and a face sealing being a separate piece bonded to the full face mask, said face sealing comprises an integral part forming an inner mask sealing off an upper volume in the full face mask from a lower volume in the full face mask, wherein said face sealing further comprises a rim and a fold abutting the rim to create double sealing surfaces for sealing said full face mask against the forehead and face of the user.

2. The disposable full face mask according to claim 1, wherein the filter unit comprises an electrostatic filter, a HEPA filter, a carbon filter or any combination thereof.

3. The disposable full face mask according to claim 1, wherein the full face mask is manufactured from PET.

4. The disposable full face mask according to claim 1, wherein said inner mask has air inlet openings.

5. The disposable full face mask according to claim 4, wherein one-way valves are arranged in said openings.

6. The disposable full face mask according to claim 1, wherein said inner mask sealingly engages with an inside of the full face mask at exhalation, but allows air to pass when a pressure above said inner mask exceeds the pressure below said inner mask.

7. The disposable full face mask according to claim 1, wherein said full face mask comprises an integrated resilient sealing rim formed in said one step vacuum forming process.

8. A PAPR comprising the disposable full face mask according to claim 1.

9. The PAPR according to claim 8, wherein a one-way valve is arranged in said air outlet with a housing surrounding said air outlet on the outside of said disposable full face mask enclosing a volume sufficient to prevent surrounding air to enter the face mask before the valve closes at inhalation.

10. The PAPR according to claim 8, wherein a one-way valve is arranged in the air inlet.

11. The PAPR according to claim 8, wherein the disposable full face mask includes an integrated sealing rim formed in said one-step vacuum forming process, and a harness adapted to be removably fitted around the disposable full face mask and to abut said rim when the full face mask and the harness are assembled.

12. The PAPR according to claim 8, wherein the blower unit comprises a differential pressure sensor.

13. The PAPR according to claim 12, wherein said differential pressure sensor comprises an IR light emitter, a reflected IR light receiver, and an IR light reflecting surface reactive to a pressure difference between the outside and the inside of the full face mask.

14. The PAPR according to claim 13, wherein said IR light reflecting surface is the surface of a flexible diaphragm arranged in the blower unit and communicating on one side with ambient pressure and on the other side with the pressure prevailing inside the full face mask.

* * * * *